United States Patent [19]
Fernandez

[11] Patent Number: 5,287,939
[45] Date of Patent: Feb. 22, 1994

[54] ELECTRONIC SOLENOID SHIFTED POWER TAKEOFF DEVICE

[75] Inventor: Rickey J. Fernandez, Broken Arrow, Okla.

[73] Assignee: Muncie Power Products, Inc., Muncie, Ind.

[21] Appl. No.: 967,382

[22] Filed: Oct. 28, 1992

Related U.S. Application Data

[63] Continuation-in-part of Ser. No. 673,121, Mar. 20, 1991, abandoned.

[51] Int. Cl.⁵ .................. B60K 17/28; H01F 5/00
[52] U.S. Cl. .................................. 180/53.1; 74/11; 335/256; 335/268
[58] Field of Search ............ 180/53.1, 53.5, 14.1; 335/255, 256 X, 266, 268 X; 192/17 C; 74/11 X, 15.8, 15.82, 15.86; 361/154, 166, 210; 222/627

[56] References Cited

U.S. PATENT DOCUMENTS

| | | | |
|---|---|---|---|
| 2,798,581 | 7/1957 | Supitilov | 192/81 R |
| 3,577,789 | 5/1971 | Sansam | 74/11 |
| 4,065,096 | 12/1977 | Frantz et al. | 335/256 |
| 4,334,435 | 7/1977 | Bayliss | 188/173 |
| 4,573,365 | 3/1986 | Kennard et al. | 74/15.8 |
| 4,573,366 | 3/1986 | Kennard | 74/15.8 |
| 4,651,852 | 3/1987 | Wickham | 192/2 |
| 4,671,395 | 6/1987 | Dobberpuhl | 192/17 C |
| 4,699,562 | 6/1987 | Taga | 180/53.1 |

FOREIGN PATENT DOCUMENTS

| | | | |
|---|---|---|---|
| 0648333 | 9/1962 | Canada | 335/255 |
| 0040123 | 5/1982 | Japan | 192/48.2 |

Primary Examiner—Margaret A. Focarino
Assistant Examiner—Paul Dickson
Attorney, Agent, or Firm—Myers, Liniak & Berenato

[57] ABSTRACT

There is provided a mechanism for engaging a power takeoff employed primarily to drive a load from a truck engine having a solenoid with a high energy coil that is energized for a short interval to produce engagement of the power takeoff and a low energy coil to maintain engagement of the power takeoff. The mechanism includes an armature movable from a retracted to an activated position to move the power takeoff engagement mechanism to a power takeoff engaged position and a high rate spring which is compressed if the power takeoff does not engage whereby to return the armature to its retracted position upon de-energization of the high energy coil. A second lower rate spring moves the armature to its retracted position upon de-energization of the lower energy coil.

14 Claims, 4 Drawing Sheets

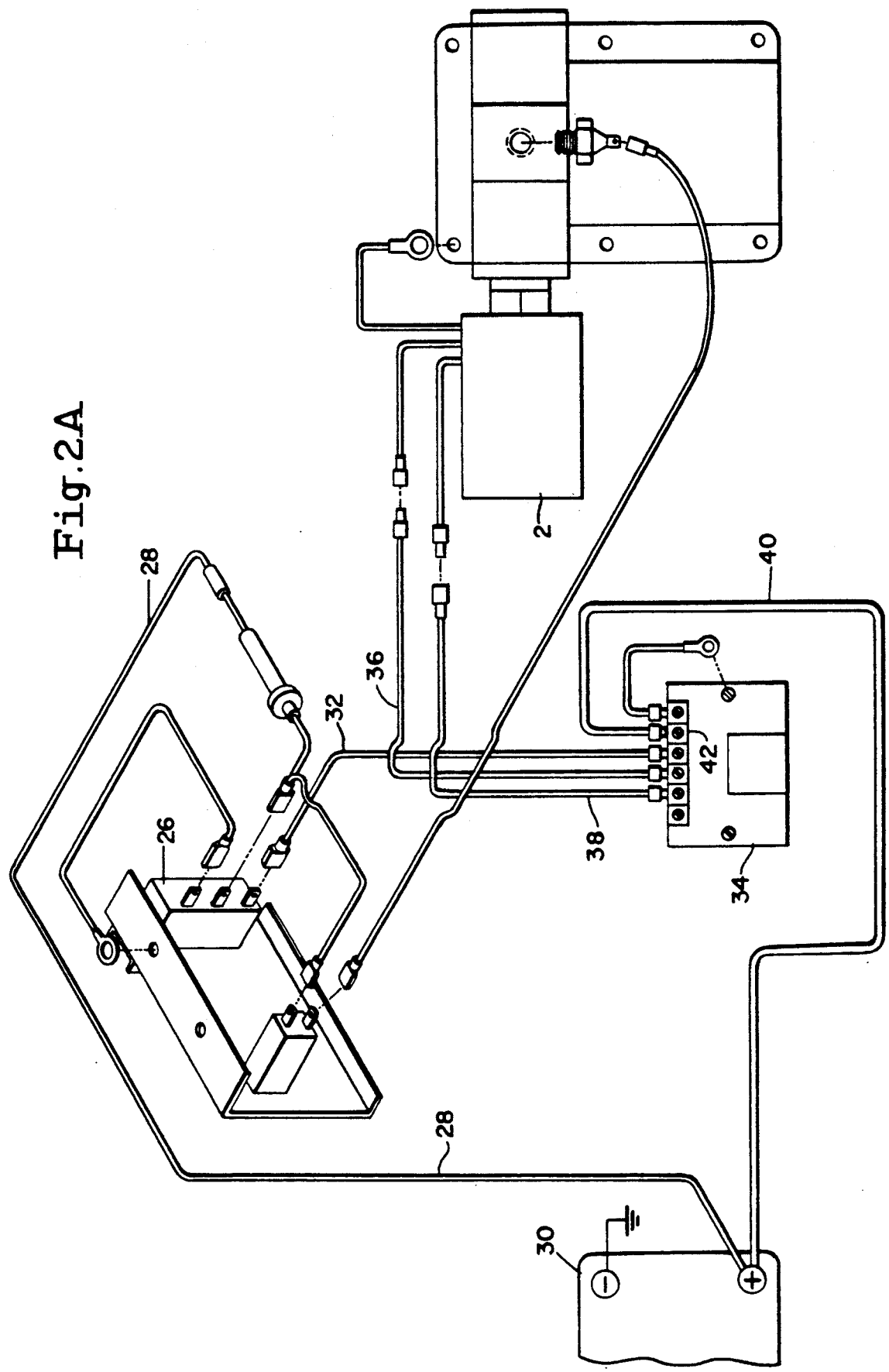

ELECTRONIC SOLENOID SHIFTED POWER TAKEOFF DEVICE

CROSS-REFERENCE TO RELATED APPLICATION

This application is a continuation-in-part of co-pending application Ser. No. 07/673,121 filed Mar. 20, 1991, now abandoned.

The present invention relates to power takeoff devices operated by an electrically actuated solenoid and more particularly to apparatus located between the shift mechanism for engaging on a power takeoff device for trucks and a solenoid for activating the power takeoff device whereby the solenoid armature may be fully extended in spite of failure of a drive gear and a driven gear to mesh.

BACKGROUND OF THE INVENTION

Conventionally power takeoff ("PTO") devices are hydraulically or air actuated, but in those instances where hydraulic or air systems are not available, levers and/or cable systems are employed. Such systems are cumbersome to operate.

There are a number of electric motor or electric relay actuated PTO devices but in such instances, cables are involved and/or constant power is applied to the motor or solenoid which may damage the electrical unit such as in U.S. Pat. Nos. 3,577,789 and 4,669,562.

In the '789 device, electric power is required to both engage and disengage the PTO so that loss of power required manual disconnect of the takeoff device. Further with the use of a flexible link (FIG. 3 of the patent) there may be insufficient force to effect the shift of the PTO into gear resulting in damage to the device.

OBJECTS OF THE PRESENT INVENTION

It is an object of the present invention to provide a solenoid actuated shift mechanism for engaging a PTO unit which mechanism prevents damage to the electrical device and which does not require the use of cables or the like.

It is yet another object of the present invention to apply a large current to a solenoid for a short period of time to produce engagement of the PTO device and to maintain a holding current to a holding coil at all times to insure the PTO device remains engaged if engagement of the PTO is achieved.

It is still another object of the present invention to eliminate cables from the engagement mechanism of a PTO to avoid the necessity of subsequent adjustments due to cable stretch with time.

Another object of the present invention is to provide a PTO wherein electrical power is required only to engage the device, failure of power automatically causes disengagement.

Still another object of the present invention is to provide a control for engaging a PTO in which there is a direct enclosed mechanical connection between the control and the PTO whereby there are no exposed moving parts.

It is another object of the present invention to provide a control mechanism for engaging a PTO in which the PTO is automatically returned to the disengaged position if engagement is not accomplished within a prescribed length of time.

BRIEF DESCRIPTION OF THE PRESENT INVENTION

The present invention employs a dual coil solenoid; a first high energy coil for receiving for a limited period of time a large current which, in certain embodiments, is sufficient in and of itself to provide the force necessary to produce engagement of the PTO, and a second low energy coil to receive a lesser current immediately after deactivation of the high energy coil for holding the PTO in its engaged position if, in fact, engagement occurs during the period of energization of the first high energy coil. In certain other embodiments, initial activation of both coils is employed to produce engagement of the PTO, while the low energy coil continues to be activated after the high energy coil is deactivated, thereby to serve as the "holding" coil for maintaining engagement of the PTO.

In both embodiments the solenoid shifts the PTO through a resilient, piston actuated assembly including a piston driven by the armature of the solenoid against the force of two compression springs, a spring of higher compression rate extending between the piston and a slide carrying the shifting yoke of the PTO and a compression spring of a lower compression rate extending between the slide and the end wall of the aforesaid assembly. The slide carries the shifting fork or yoke of the PTO so that upon movement, the shifting fork or yoke moves a shift collar so that the driven gear of the PTO is engaged with the drive gear.

Upon application of current to either the large current coil or both coils of the solenoid, depending upon which embodiment is employed, the yoke is moved to produce engagement of the PTO such as those described in U.S. Pat. Nos. 4,573,365 and 4,573,366 for instance (both assigned to the assignee of the present invention and incorporated herein by reference). Initially, the low compression rate spring (e.g. 32 lbs./in.) is compressed and if the teeth of the drive and driven gear of the PTO mesh, the solenoid armature extends fully without requiring compression of the high rate spring. If, however, the teeth do not initially mesh, the high compression rate spring (e.g. 400 lbs./in.) is then compressed, allowing the armature to extend fully. Thus if and when the teeth do mesh within the time period allotted for activation of the high energy coil, the movement of the yoke to provide full engagement is achieved and engagement of the PTO results.

Regardless of whether or not engagement does occur, the actuating current to the main (i.e. high energy) coil of the solenoid is terminated after a prescribed time interval as aforesaid In this way, large currents are only employed in the initial phase of operation for the purpose of driving the yoke with a large force, first against the bias of a low compression rate spring and, if engagement is not achieved, against the bias of a higher compression rate spring. This reduces the danger of harm to the solenoid. To this end, if engagement occurs, the lesser holding current applied to the secondary (i.e. low energy) coil of the solenoid is the only current employed to maintain the engagement of the PTO. If the PTO does not engage within the time interval during which the high energy coil is energized, the piston is returned to its initial position by decompression of the springs and the cycle may be repeated.

This invention will now be described in relation to certain illustrated embodiments.

BRIEF DESCRIPTION OF THE DRAWINGS

FIG. 2A is a schematic circuit diagram of another embodiment of an electrical control for the solenoid employed to drive the piston actuated assembly of FIG. 1.

DETAILED DESCRIPTION OF THE PRESENT INVENTION

Figure 1:
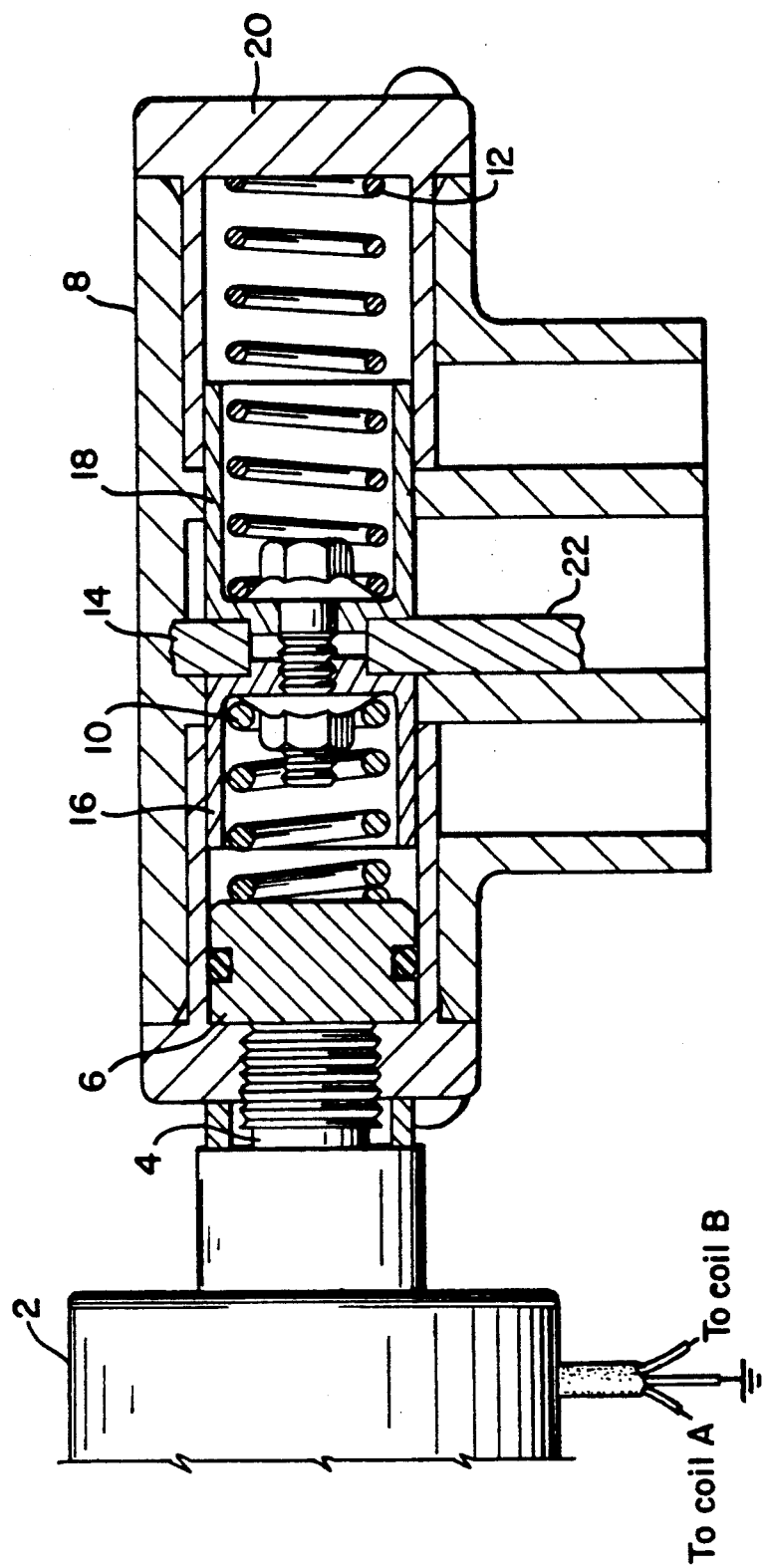
FIG. 1 is a sectional side view of the piston actuated assembly of the present invention.

Referring specifically to FIG. 1 of the accompanying drawing there is illustrated in a cross-sectional diagram, a solenoid 2 which may be a dual coil solenoid. A solenoid suitable for use herein is available from the Trombetta Corporation at 1633 East North Avenue, Milwaukee, Wis., Model No. 515-EX10, 12VDC. Another, by this same company, is Model No. Q515-A62, 12VDC. These solenoids have two coils; a heavy duty or drive coil designated herein as coil A, and a holding coil designated as coil B. The solenoid is described in detail in FIG. 3.

The solenoid 2 has a steel plunger 66 (see FIG. 3) that slides in a member 4 and moves from left to right as viewed in FIG. 1 when the solenoid is energized. The steel plunger 66 is driven by an armature of the solenoid 2. The steel plunger 66 drives a piston 6 of piston assembly 8 which, in turn, drives against a high compression rate spring 10 in control with piston 6 and a low compression rate spring 12. Located between the two springs is a slide or guide 14 having axially, oppositely extending hollow cylindrical regions 16 and 18 for retaining springs 10 and 12 respectively; the spring 12 being seated at its right end against right end wall 20, as viewed in FIG. 1 of the assembly 8. The slide 14 has secured thereto yoke 22 of the PTO, yoke 22 corresponding, for instance, to yoke 67 of FIG. 9 of U.S. Pat. No. 4,573,366.

In the operation of one embodiment envisioned by this invention, both coils A and B are energized simultaneously such that the coil B contributes to the overall engagement force. In another embodiment only coil A is initially energized to create the engagement force, and coil B is energized only upon engagement so as to only serve as a "holding" force. In either embodiment, initial energization results in the armature of the solenoid (see armature 50 of FIG. 3) moving toward the right, initially causing compression of only spring 12 and thus movement of slide 14 and yoke 22 to the right. Movement of slide 14 against spring 12 and consequently movement of yoke 22 is great enough (e.g. about ¼ inch) to produce full engagement of the PTO. If, however, the teeth of the drive and driven gears of the PTO do not initially mesh, yoke 22 cannot move to its full extent to the right, and the armature 4 would not be able to extend fully except for the spring 10. If the yoke cannot move fully to the right, the piston 6 compresses the spring 10 so that full movement of the solenoid armature is permitted and full extension of the yoke occurs if the teeth subsequently mesh.

Figure 2:
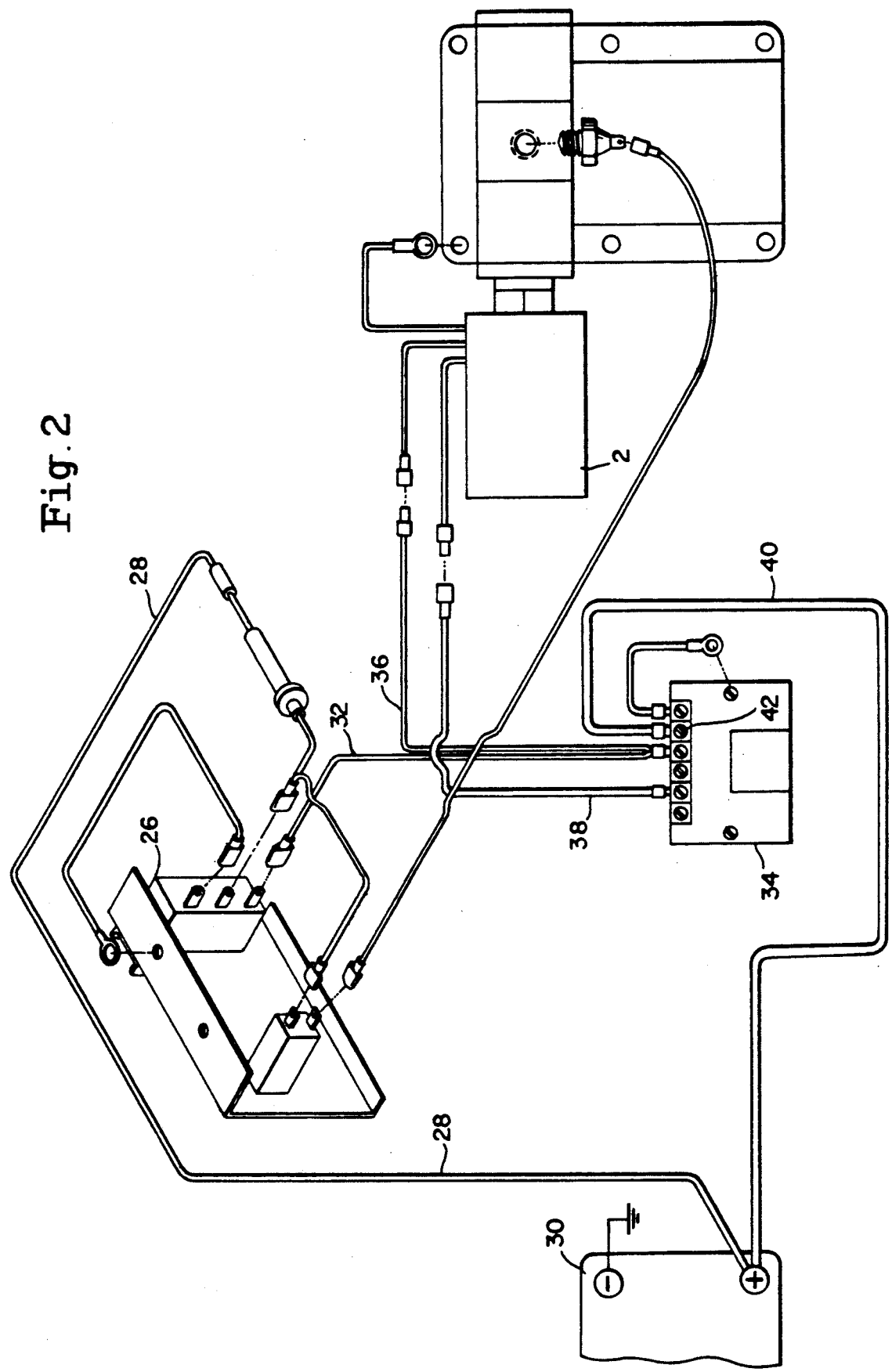
FIG. 2 is a schematic circuit diagram of one embodiment of an electrical control for the solenoid employed to drive the piston actuated assembly of FIG. 1.

As will become apparent in the description of FIGS. 2 and 2A of the accompanying drawings, the current to the coil A is terminated after a predetermined interval, for instance, approximately 3 seconds. If engagement occurred during this time period, B coil is used to maintain the armature fully extended and thus the PTO remains engaged. The B coil, however, cannot alone produce engagement of the PTO; that is, it cannot move the slide 14 against the force of the spring 12, it can only "hold" the position of slide 14 against the force of spring 12. Thus the coil B in one embodiment may remain energized at all times during the interval of time that power is being applied to the control of the PTO, or in another embodiment, coil B may be activated only when it is needed to "hold" the PTO in its engaged position. In the first embodiment the pulling force of coil A need only be strong enough so that, together with coil B, it can achieve engagement. In the second embodiment, coil A must do all the pulling to achieve engagement, and thus must be designed accordingly.

Regardless of which embodiment is chosen, upon removing power from the control of the PTO, the springs 10 and 12 expand and return the slide 14, yoke 22, piston 6 and plunger 4 of the solenoid 2 to their original, unactuated, positions and the external load is disengaged. Thus power is not required to disengage the PTO.

In one particular arrangement of the apparatus the total stroke of the plunger 4 is about ½ inch. The teeth of the gears come into contact after about ¼ inch of the stroke, the remaining ¼ inch of movement producing engagement of the drive and driven gears.

The electrical control system for the embodiments of this invention where both coils A and B are initially actuated to provide the engagement force, is illustrated in FIG. 2. Coil A is the high energy coil. Coil B is the low energy coil As illustrated, the system includes a rocker switch 26 mounted in the dash of the vehicle; the switch receiving current over a lead 28 from the vehicle's battery 30. Current from the switch 26 when moved to the "on" position is applied over lead 32 and activates a timer and high current relay 34. The timer and high current relay is Control Module Model No 5500-A-9 of the Trombetta Corporation. A lead 36 is connected to the same terminal on the relay 34 as the lead 32 so that current is supplied to the coil B of the solenoid. Thus whenever the rocker switch 26 is turned to the "on" position the coil B is energized. In addition, upon the timer and high current relay being initially activated, it applies a high current to its lead 38 that is connected to the coil A of the solenoid. Current applied to lead 38 is derived from battery cable 40 connected to terminal 42 of the timer relay 34. Thus, at initial activation both coils A and B are energized.

The current applied to coil B, as well as that applied to coil A cause the PTO to become engaged. Coil B, of course, is insufficient by itself to achieve engagement. It is preferred, in this respect, and with this embodiment, that engagement can only be achieved if both coils A and B are energized. Thus if either coil is dysfunctional, no engagement can occur as a safety feature. The timer of the element 34 terminates current to the lead 38 and thus to the coil A of the solenoid after a specified time interval. If engagement of the PTO has occurred, the PTO remains engaged through the "holding" action of coil B which remains energized as long as switch 26 is activated. If engagement of the PTO has not occurred, then the solenoid withdraws its armature under the force of springs 10 and 12 and the solenoid is in position for the next activation of the coils. The coil B is able to hold the PTO in engagement once engaged, since only the spring 12 is compressed and the coil B can hold the armature extended against the force of that spring. However, coil B can not hold the armature fully extended against the force of both springs 10 and 12.

Thus in operation, upon closure of switch 26 current is supplied directly to the coil B of solenoid 2 and to the coil A through the timer and high current relay 34. The solenoid armature is advanced against the force of spring 12 and moves the yoke 22 of the PTO in a direction to produce engagement between the drive and driven gears of the PTO. If engagement occurs only the spring 12 is compressed and after a specified time interval, desirably approximately 3 seconds, the coil A is de-energized and coil B holds the PTO in engagement.

In the event the gears of the PTO do not engage immediately, the spring 10 is compressed allowing the armature of the solenoid to extend fully. If engagement of the PTO occurs within the 3 second interval, the spring 10 expands to its decompressed size and operation is as above. If engagement does not occur within the specified interval, energization of coil A is terminated and the armature is withdrawn under the force of springs 10 and 12. In this respect, coil B's "holding" force is preferably designed so that at the point before or at, where spring 10 is decompressed, the "holding" force of coil B at that point is insufficient to hold the partially compressed spring 12, and thus full retraction of the armature to its starting point occurs.

FIG. 2A illustrates the electronic control system for the embodiments where coil A provides all of the pulling force of the armature to achieve engagement and coil B is used solely as a "holding" coil once engagement is achieved. Here the electrical control system includes a rocker switch 26 mounted in the dash of the vehicle; the switch receiving current over a lead 28 from the vehicle's battery 30. Current from the switch 26 when moved to the "on" position is applied over lead 32 and activates a timer and high current relay 34. The timer and high current relay is again preferably a Control Module Model No. 5500-A-9 of the Trombetta Corporation. It is to be noted here, however, that lead 6 is not connected to the same terminal on relay 34 as lead 32 (as they were in FIG. 2). Instead, their terminals are different, as illustrated in FIG. 2A and as explained below.

Once again, as in FIG. 2, so in this embodiment, upon the timer and high current relay being initially activated, a high current via lead 38 is applied to coil A of the solenoid. Current applied to lead 38 is derived from battery cable 40 connected to terminal 42 of the timer relay 34. The current applied to coil A moves the yoke toward engagement and either causes the PTO to become engaged, or if engagement does not occur, nevertheless, allows the armature of the solenoid to fully extend by way of the compression of coil spring 10. The timer of the element 34 eventually terminates current to the lead 38 and thus to the coil A of the solenoid after a specified time interval as before. Up to this point, coil B has not been activated. However, in this embodiment, when this termination of current occurs, it is transferred by the relay 34 (in a conventional manner) to lead 36 and thus to coil B of the solenoid. If engagement of the PTO has occurred, the PTO remains engaged through the holding action of coil B which remains energized as long as switch 26 is activated. If engagement of the PTO has not occurred, then the solenoid withdraws its armature under the force of springs 10 and 12 and the solenoid is in position for the next activation of the coil A.

Thus in operation of this embodiment (FIG. 2A), upon closure of switch 26 current is supplied only to the coil A of solenoid 2 through the timer and high current relay 34. The solenoid armature is advanced against the force of spring 12 and moves the yoke 22 of the PTO in a direction to produce engagement between the drive and driven gears of the PTO. If engagement occurs, only the spring 12 is compressed and after a specified time interval, desirably approximately 3 seconds, the coil A is de-energized and coil B energizes and holds the PTO in engagement.

In the event the gears of the PTO do not engage immediately, the spring 10 is compressed allowing the armature of the solenoid to extend fully. If engagement of the PTO occurs within the 3 second interval, the spring 10 expands to its decompressed size and operation is as above. If engagement does not occur within the specified interval, the armature is withdrawn under the force of the springs 10 and 12. Once again, coil B is desirably designed as aforesaid to allow full retraction of the armature.

Figure 3:
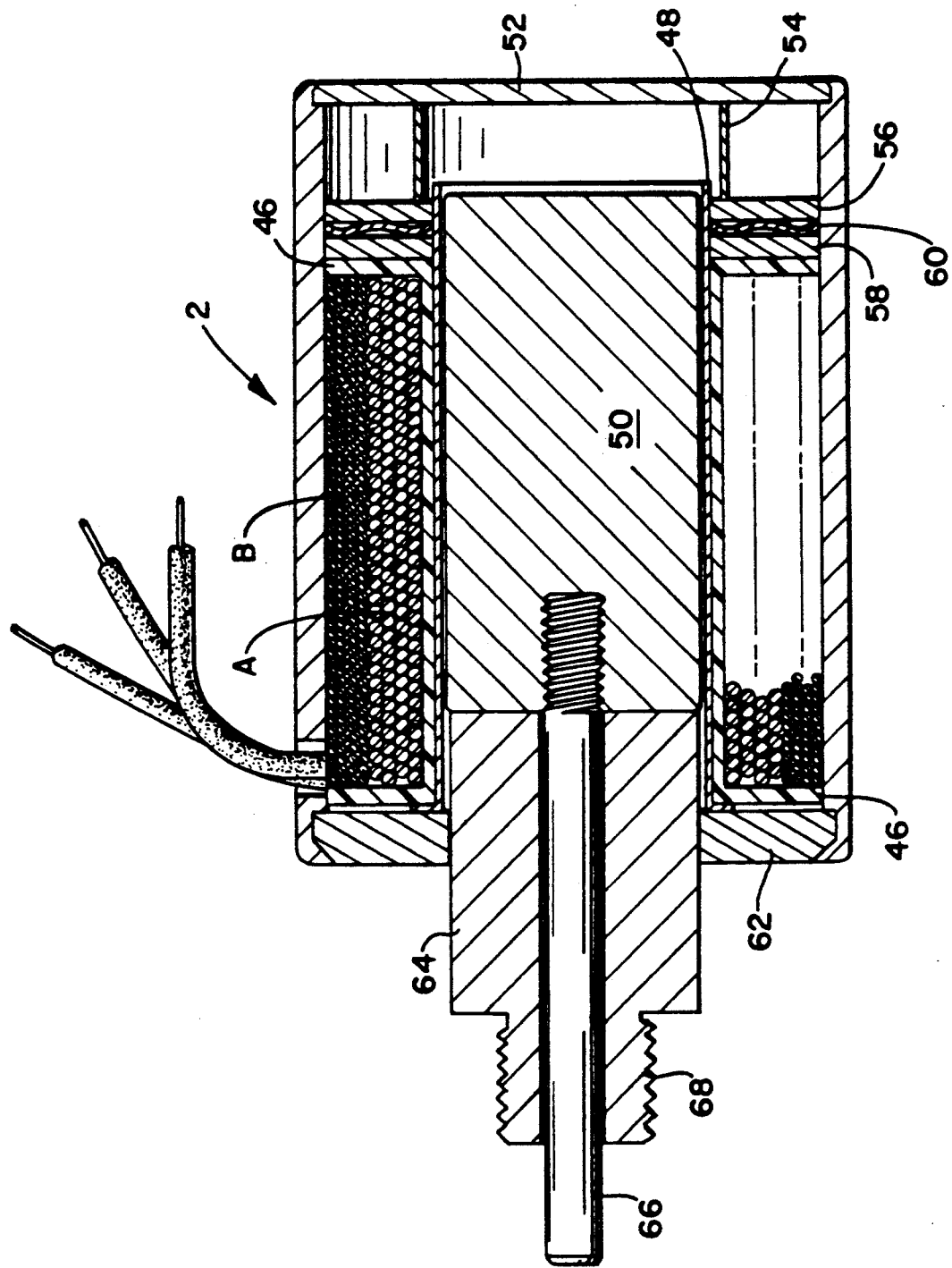
FIG. 3 is a breakaway view of the solenoid of the present invention.

Referring now specifically to FIG. 3 of the accompanying drawings, there is illustrated a breakaway view of one preferred solenoid 2 employed to actuate the PTO. This is the solenoid referenced above as Model No. 515-EX10, 12VDC. The solenoid has two windings A and B wound on a plastic spool 46 disposed about a brass sleeve 48 within which is disposed a steel sliding cylindrical core 50. The core 50 is a ferromagnetic material which, when the coil A (alone or with coil B, according to the embodiment chosen) is energized, is moved to the left as viewed in FIG. 3, approximately 0.56 inch; this being the position shown in FIG. 3. When the core 50 is in the coil de-energized position the core 50 is seated adjacent to end wall 52 of the solenoid.

The spool 46 is positioned relative to end wall 52 by spacer 54, two flat washers 56 and 58 with a wavy or spring wave washer 60 therebetween. The washer 60 biases the spool against left end wall 62 of the solenoid.

The core 50 slides between the end wall 52 and a cylindrical member 64 secured in end wall 62. The member 64 external to the wall 62 may have flats ground on it to provide a hex nut for receiving a wrench to tighten the solenoid in the piston assembly. The core 50 carries a coaxial steel plunger 66 (diameter of 0.312 inch approximately) from its left end, as viewed in FIG. 3, of the core 50, through a central bore in the member 64 and to the exterior where it connects to piston assembly 8. The connection between elements 8 and 2 is by means of external threads on a member 68 which is an extension of reduced diameter of the member 64. The piston assembly 8 has corresponding internal threads so that the solenoid 2 and piston assembly 8 may be mated.

The length of the solenoid is approximately 4.31 inches long from wall 52 to wall 62 and the diameter of this region is 2.625 inches. Total length from wall 52 to the left end of member 68 is approximately 5.685 inches.

The A and B windings on the spool 46 are of copper wire. The spool is 2.55 inches long, has an inner diameter of 1.334 inches and an outer diameter of 2.340 inches. The A winding comprises four layers of 0.064 inch diameter wire and has a d.c. resistance of approximately 0.3 ohms. The B winding which is 0.022 inch wire fills the remainder of the spool. The d.c. resistance of the B winding is approximately 5.9 ohms.

The forces developed by the solenoid are set forth in the table below:

| Stroke (inches) | .06 | .12 | .25 | .38 | .50 | .56 | HOLD |
|---|---|---|---|---|---|---|---|
| Lbs. Force (77° F.) | 209 | 150 | 109 | 85 | 69.1 | 68.5 | 104 |
| Lbs. Force (250° F.) | 183 | 125 | 82.1 | 59.7 | 47.6 | 46.6 | 68 |

Another preferred solenoid that may be used in the practice of this invention is, as mentioned above, Model No. Q515-A62, 12VDC. This solenoid has substantially the same properties as the formerly referred to solenoid, but exhibits better resistance to corrosion.

The holding (hold) force is with coil A de-energized. The term "yoke" as used herein refers to the movable member of a power takeoff employed to engage and disengage the PTO regardless of its form.

Once given the disclosure, many other features, modifications and improvements will become apparent to the skilled artisan. Such other modifications, features and improvements are, therefore, considered a part of this invention, the scope of which is to be determined by the following claims.

I claim:

1. A mechanism for engaging a power takeoff having a drive gear and a driven gear and a yoke for moving a shift collar so that one of the gears engages with the other of the gears comprising
   a solenoid having an armature and a low energy coil and a high energy coil,
   an actuator having a piston, a slide, a heavy duty spring located between said piston and said slide and a lower duty spring located between said slide and an end wall of said actuator remote from said piston,
   said armature upon energization of at least said high energy coil moving said piston toward said end wall,
   a shifting yoke of said power takeoff secured to said slide for movement therewith,
   a circuit for energizing said high energy coil for a specified length of time only, and
   a circuit for energizing said low energy coil at least at all times after said specified length of time when said high energy coil is energized.

2. A mechanism according to claim 1 wherein said circuits for energizing said high energy and low energy coils include means for energizing both said coils simultaneously, such that said circuit for energizing said low energy coil energizes said low energy coil at all times that said mechanism is in operation.

3. A mechanism according to claim 1 wherein said circuit for energizing said low energy coil energizes said low energy coil only after said specified length of time, such that said high energy coil provides the sole force for moving said armature toward an engaging position and said low energy coil after said specified length of time provides the sole force for holding said armature in its engagement position.

4. The mechanism according to claim 1 which further includes means for retracting said armature to its fully retracted position after de-energization of both said coils, or after said specified length of time when said low energy coil is energized, but engagement of said power takeoff has not occurred.

5. A mechanism for engaging and disengaging a driven gear and a drive gear of a power takeoff device, via a yoke connected to said driven gear, and for automatically disengaging said driven gear from said drive gear should they not become fully engaged within a predetermined period of time, said mechanism comprising:
   a solenoid having a movable armature coupled to said yoke, a low energy coil and a high energy coil,
   a control means for energizing said coils, such that the energizing of said high energy coil is maintained for only a predetermined period of time, while the energizing of said low energy coil occurs at least as soon as the time substantially immediately after expiration of said predetermined period of time that said high energy coil is energized, and
   means normally biasing said armature against movement and in the direction of disengagement of said gears, said biasing means being sufficiently resilient to allow said armature to move a sufficient distance to bring said driven gear into full engagement with said drive gear when at least said high energy coil is energized and to move said driven gear to a fully disengaged position from said drive gear if said gears do not fully engage during said predetermined period of time said high energy coil is energized, or if at a time after said high energy coil has been de-energized and said gears are in full engagement, said low energy coil is de-energized.

6. A mechanism according to claim 5 wherein said control means includes means for energizing said low energy coil only at a time substantially immediately after said predetermined period of time expires.

7. A mechanism according to claim 5 wherein said control means includes means for energizing said low energy coil at all times that said control means is activated.

8. A mechanism according to claim 7 wherein the energization of both said coils is required to move said armature a sufficient distance to bring said driven gear into full engagement with said drive gear.

9. The mechanism according to claim 5 wherein said armature includes a plunger, a piston and a slidable cylindrical housing in which said biasing means reside, said armature co-acting with said biasing means, such that said piston and said plunger can move to a fully extended position when said gears do not become fully engaged.

10. A mechanism according to claim 9, wherein said biasing means includes a first resilient member for moving said armature in the power takeoff disengaging direction upon de-energization of said low energy coil when said power takeoff is engaged and after said high energy coil has been de-energized.

11. A mechanism according to claim 10 wherein said biasing means further includes a second resilient member located in relationship to said first resilient member and co-acting with said armature, such that upon failure of said power takeoff to engage during energization of said high energy coil, said second resilient member is stressed, thereby to allow said piston and said plunger to become fully extended when said gears do not become fully engaged.

12. A mechanism according to claim 11 wherein said first resilient member is a first compression spring disposed between said armature and said yoke.

13. A mechanism according to claim 12 wherein said mechanism has an end wall remote from said armature, and wherein said second resilient member is a compression spring of lesser spring rate than said first compression spring.

14. A mechanism according to claim 13 wherein said first resilient member has a higher spring rate than said second resilient member.

* * * * *